Dec. 1, 1942.  C. A. COBB ET AL  2,303,615
POULTRY BATTERY
Filed Oct. 28, 1940  2 Sheets-Sheet 1
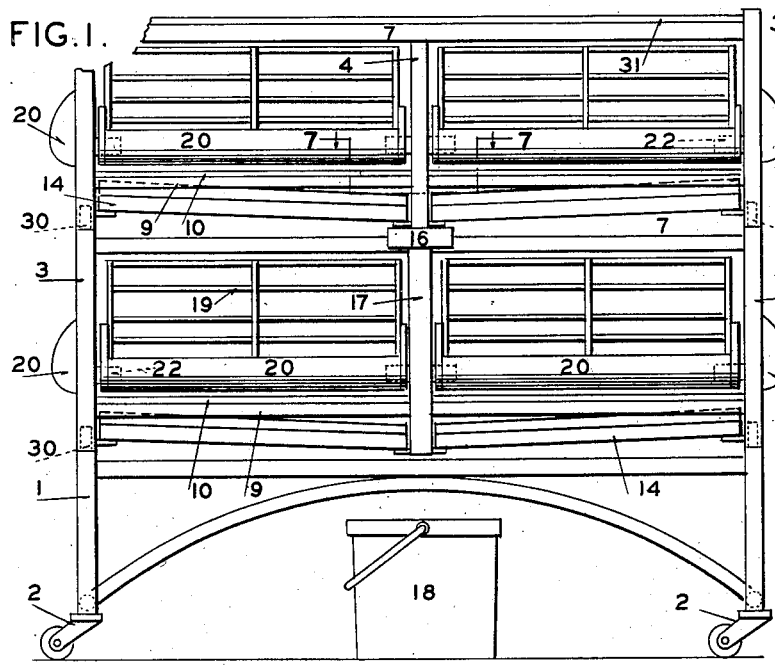
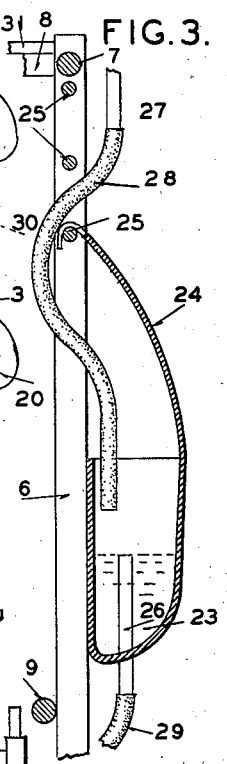
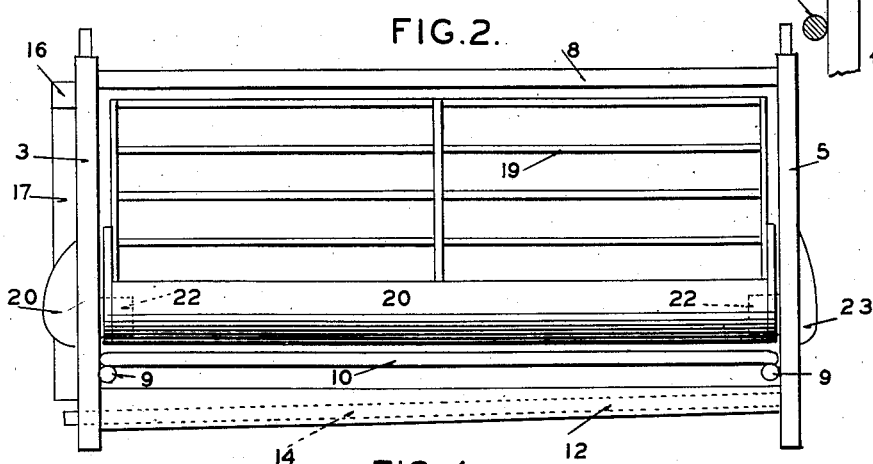
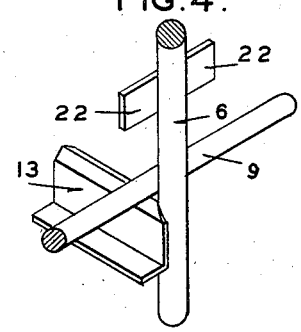
INVENTORS
C. A. COBB
L. KISHLAR
BY
E. A. Huffman
ATTORNEY Dec. 1, 1942. C. A. COBB ET AL 2,303,615
POULTRY BATTERY
Filed Oct. 28, 1940 2 Sheets-Sheet 2

INVENTORS
C. A. COBB
L. KISHLAR
BY
ATTORNEY

Patented Dec. 1, 1942

2,303,615

UNITED STATES PATENT OFFICE 2,303,615

POULTRY BATTERY

Clifton A. Cobb, University City, and Lamar Kishlar, Webster Groves, Mo., assignors to Ralston Purina Company, St. Louis, Mo., a corporation of Missouri Application October 28, 1940, Serial No. 363,124

1 Claim. (Cl. 119—17)

Our invention relates to a poultry feeder and more particularly to a feeder of the battery type which is built up of a variable number of units, each unit comprising a coop or enclosure provided with the necessary appurtenances for caring for the enclosed poultry. The specific form of feeder shown is especially designed for the care of ducklings but may be employed with or without modification for the care of other kinds of poultry.

One object of our invention is to so construct the feeder as to avoid corners and crevices which might collect dirt and infectious matter.

Another object of our invention is to provide for ready access to all parts of the device for the purpose of cleaning.

Figure 5:
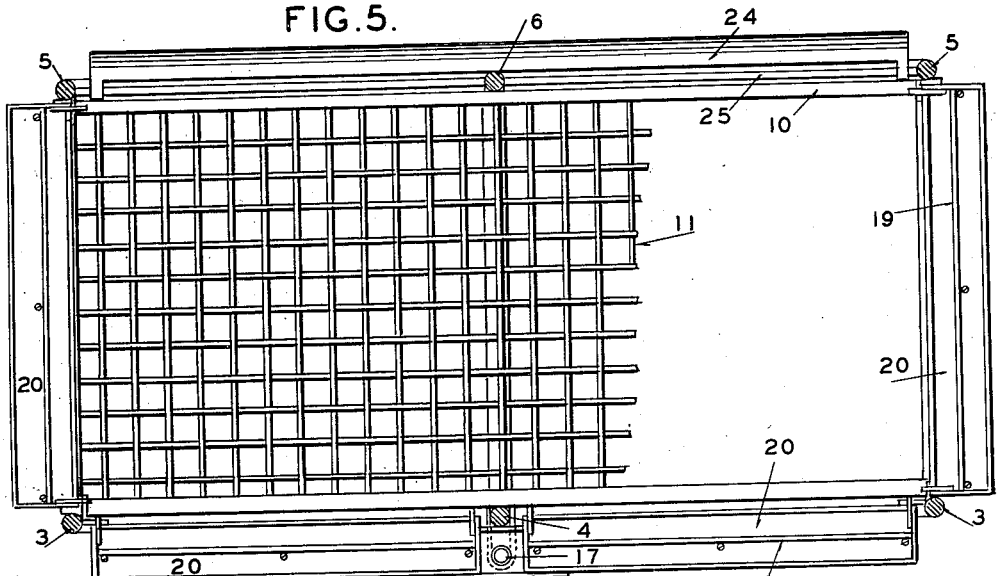
Figure 6:
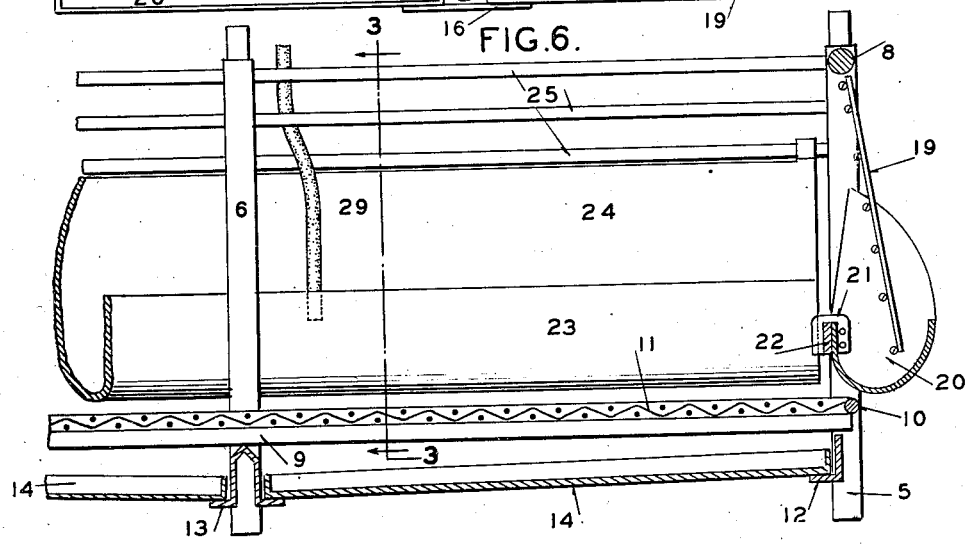
Figure 7:
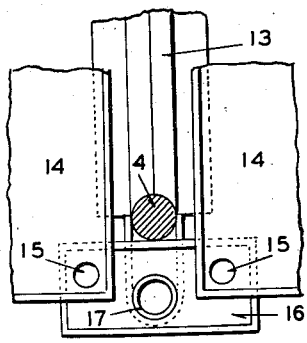

In the accompanying drawings which illustrate one form of feeder made in accordance with our invention Figure 1 is a front elevation of a battery; Figure 2 is an end view of a single unit; Figure 3 is a section taken on the line 3—3 of Figure 6; Figure 4 is a fragmentary perspective view of the frame; Figure 5 is a horizontal section, a part of the net of the floor being broken away; Figure 6 is a vertical section through one end of a unit showing a slight modification; and Figure 7 is an enlarged section taken on the line 7—7 of Figure 1.

The battery will usually include several units but for convenience of illustration we have shown in Figure 1 only two units carried on a base 1 preferably mounted on casters 2 for convenience in shifting the position of the battery. Each unit comprises a pair of front corner posts 3, a front center post 4, a pair of rear corner posts 5, and a rear center post 6. These posts are connected together near their upper ends by longitudinal bars 7 and cross-bars 8 to form a frame. All these parts are preferably cylindrical in form and united by brazing or welding. The posts are also connected near their lower ends by longitudinal bars 9 which are secured to the inner sides of the posts in order to form a pair of ledges which support a frame 10 covered with wire netting 11 forming the floor of the coop. Each pair of front and rear corner posts is connected by an L-shaped plate 12 and the front and rear center posts are connected by an inverted U-shaped plate 13. The flanges of these plates support the dropping pans 14 directly beneath the floor. There are two of these pans for each unit and the supporting plates are so arranged that the pans are highest at their rear sides and outer ends so that their contents flow to their inner front corners. These corners are provided with drain openings 15 through which the contents are discharged into a catch basin 16 on the upper end of a downspout 17 carried on post 4. When several units are employed each downspout discharges into the one below it. The discharge from the lowest unit is caught in a suitable container such as the slop pail 18. The downspout may be omitted from the top unit, as shown, as there are no pans above it.

The front and end walls of each unit are formed by lattice panels 19, two being employed for the front wall and one for each end wall. These panels are carried by the feed trough 20 in order to be removable therewith. The troughs are secured in position by hooks 21 (Figure 6) which engage with lugs 22 on the posts. The rear wall of the unit has its lower part formed by a water trough 23 and splash guard 24 which is formed integral with or attached to said guard. The trough 23 is suspended by hooks on its guard from the lowest of a set of rods 25 forming a fixed lattice panel between the top of the guard and the bar 7. This bar 7 may, however, be omitted, as shown in Figure 6, as the fixed lattice will provide sufficient strength for the frame. To prevent undue splashing of the water when the ducks drink, it is desirable to force them to place their bills in the water in a nearly perpendicular position. This we accomplish by making the trough deep in proportion to its width and by maintaining the water level in it a considerable distance below its top. The latter function is attained by providing a discharge pipe 26, the opening of which is positioned at an intermediate point in the height of the trough. Water is supplied to the top trough from a suitable reservoir (not shown) by a pipe 27, preferably provided with a flexible hose 28, and is conveyed from one trough to another by means of a similar hose 29 attached to the discharge pipe.

The various units are connected to each other and to the base by telescopic joints 30. The top of the upper unit is closed by a cover 31, preferably a frame covered with wire netting like the floor.

It will be seen that our feeder battery not only provides effective means for supplying water to the poultry and draining it off, but permits easy cleaning. Not only may the various units forming the battery be readily detached from each other and from the base, but substantially all of the walls of a unit may be detached by the removal of the feed and water troughs. The floor may be drawn out at one end of the unit and the dropping pans removed at the front. Thus there remains only a simple frame composed almost wholly of tubular members which is readily cleaned.

Having fully described our invention, what we claim as new and desire to secure by Letters Patent of the United States is:

A poultry feeding battery formed of a plurality of units, a unit of said battery comprising a frame having corner and center posts connected near their upper ends by longitudinal and cross bars, a pair of longitudinal bars connected to the inner sides of said posts near their lower ends to form supporting ledges, transverse plates connecting the posts below said latter named longitudinal bars, removable feed and water troughs forming a major portion of the walls of the unit, a reticulate floor supported on said ledges, a pair of dropping pans supported on said plates, and discharge means carried by a center post for cooperation with the pans of a superimposed unit.

CLIFTON A. COBB.
LAMAR KISHLAR.